United States Patent [19]

Mang

[11] Patent Number: 5,573,039
[45] Date of Patent: Nov. 12, 1996

[54] KINK-RESISTANT FUEL HOSE LINER

[75] Inventor: Warren Mang, Haddonfield, N.J.

[73] Assignee: Markel Corporation, Norristown, Pa.

[21] Appl. No.: 396,496

[22] Filed: Mar. 2, 1995

Related U.S. Application Data

[63] Continuation-in-part of Ser. No. 78,016, Jun. 16, 1993, abandoned.

[51] Int. Cl.⁶ ....................................................... F16L 9/14
[52] U.S. Cl. ........................... 138/141; 138/137; 138/174; 138/DIG. 8
[58] Field of Search ...................... 138/33, 104, 125–127, 138/137, 138, 141, 146, 153, 174, DIG. 2, DIG. 3

[56] References Cited

U.S. PATENT DOCUMENTS

| 4,059,847 | 11/1977 | Phillips et al. | 138/125 |
| 4,463,779 | 8/1984 | Wink et al. | 138/125 |
| 4,961,977 | 10/1990 | Archer et al. | 138/125 |
| 5,062,456 | 11/1991 | Cooke et al. | 138/127 |

Primary Examiner—David Scherbel
Assistant Examiner—Terrence R. Till
Attorney, Agent, or Firm—Synnestvedt & Lechner

[57] ABSTRACT

Hoses are provided which are resistant to chemical and thermal attack and which include a polymeric liner having an integral resilient member axially located along its wall. The resilient member includes a tensile strength which is significantly greater than the polymeric material of the liner, so as to minimize the incidence of plastic deformation and kinking during manufacture, installation, and use.

20 Claims, 2 Drawing Sheets

KINK-RESISTANT FUEL HOSE LINER

This application is a continuation-in-part of application Ser. No. 08/078,016, filed on Jun. 16, 1993, now abandoned.

FIELD OF THE INVENTION

The present invention relates to kink-resistant tubes suitable for use in automotive, defense, aerospace, and industrial applications, and more particularly, to kink-resistant hoses having a high degree of flexibility, exceptional resistance to chemical and heat-induced degradation and high vapor impermeability.

BACKGROUND OF THE INVENTION

Conventional automotive hoses, such as those for delivering fuel, include an inner rubber liner which is resistant to the harsh, degrading effects of gasoline, a fiber layer surrounding the inner rubber tube, and an outer rubber tube surrounding the fiber layer. However, due in part to the recent developments in automotive technology, hoses carrying automotive fuel, such as gasoline, are frequently subject to high pressures and high temperatures. When gasoline is subjected to such conditions it tends to oxidize and develop peroxides that can potentially deteriorate the rubber liners. Such deterioration of the fuel line is likely to result in cracking or fuel leakage. Consequently, a need has arisen for hoses which are more resistant to these harsh temperature and chemical conditions.

Attempts have recently been made to overcome the deficiencies exhibited by fuel hoses made of rubber and other polymers. For example, fuel hoses comprising a fluoropolymer inner layer and a braided fiberglass outer layer have been proposed. Hoses of this type typically include a polytetrafluoroethylene (PTFE) liner having a wall thickness of about 25–35 mils. PTFE liners of this thickness are extraordinarily temperature and chemical resistant, but tend to be expensive and often kink and deform during manufacturing, packaging and use. This kinking can produce deformation and sometimes undetectable defects in the tubing which could cause the hose to fail in service and release fuel vapors or liquid fuel with obvious life-threatening consequences.

Accordingly, there is a need for a kink-resistant hose for safely delivering liquids, such as fuel and coolant. The hose should be cost effective, chemical-resistant, and have the ability to resist high temperatures.

SUMMARY OF THE INVENTION

This invention provides kink-resistant hoses, fuel liners, and fuel systems which rely upon a polymeric tube having a passage through its length for delivering fluids such as gasoline or antifreeze. The tube includes a resilient member or wire substantially fixedly disposed in a wall portion thereof. The resilient member possesses a tensile strength which is significantly greater than the polymer material which makes up the tube so as to reinforce the tube and render it substantially resistant to plastic deformation upon bending.

Accordingly, this invention provides improved liners and hoses suitable for automotive, aerospace, medical, and industrial use. The reinforcing members are preferably integral with a wall of the disclosed tubes so that bending forces applied to the tube are distributed primarily into the resilient member. This causes an increased bending radius and minimizes or substantially eliminates kinking of the liner material, which is desirably a fluorocarbon material having a relatively low tensile strength.

The disclosed liners of this invention also have very low vapor permeability and excellent heat resistance. By minimizing plastic deformation and kinking of the liner material with the disclosed reinforcing resilient members, the vapor permeability of the liner materials is preserved so that gas vapor and gasoline do not escape from the hose during use. High temperature resistance is provided to the novel liners and hoses of this invention by selecting fluorocarbon resins having a high melting point, preferably in excess of 500° F.

The reinforcing members of this invention also preserve the integrity of the preferred fluorocarbon liner materials during manufacture, for example, when subsequent layers of material are added to the relatively thin liners to manufacture a complete fuel hose.

The complete fuel hoses of this invention are extremely high temperature-resistant, have excellent thermal stability, and are designed to be flame-resistant. They are relatively chemically inert, and are compatible with many types of fuels. These specially constructed hoses are designed to accommodate all types of fittings and are easily coupled to screw machines, tube ends, or plastic fittings.

BRIEF DESCRIPTION OF THE DRAWINGS

The accompanying drawings illustrate preferred embodiments of the invention, as well as other information pertinent to the disclosure, and in which.

DETAILED DESCRIPTION OF THE INVENTION

Figure 1:
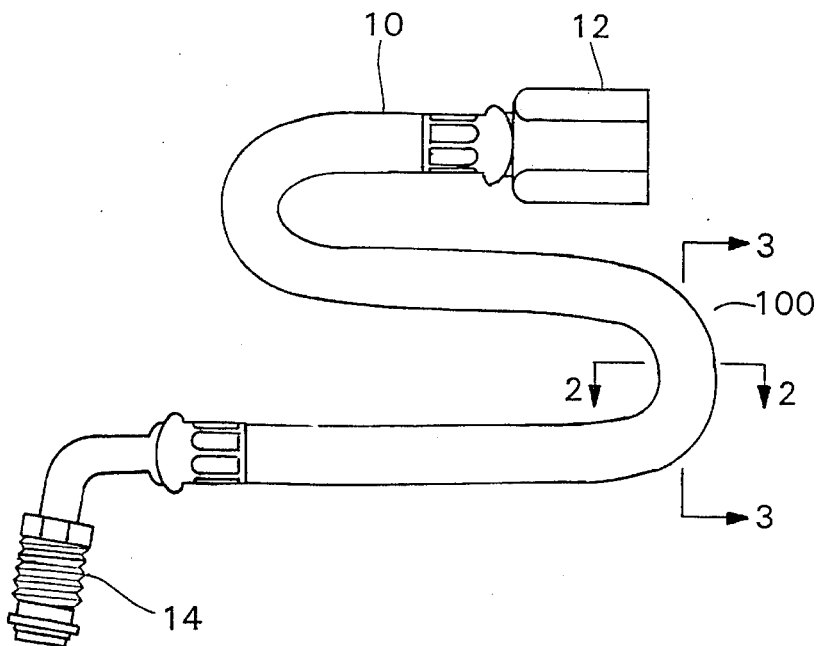
FIG. 1: is a top view of a complete fuel hose according to one embodiment of this invention, including male and female fittings.
Figure 2:
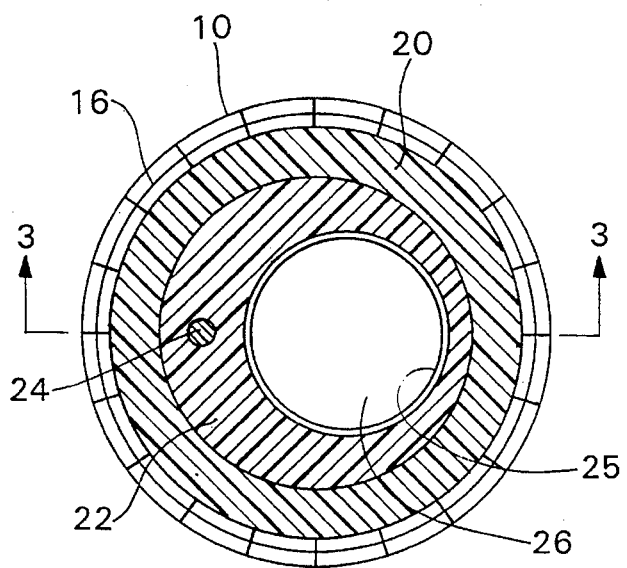
FIG. 2: is a cross-sectional view, taken through line 2—2 of FIG. 1, illustrating the internal liner, resilient member, and multiple layers of the fuel hose of FIG. 1.
Figure 2A:
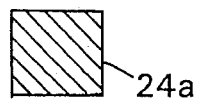
FIGS. 2A–D show different cross-sections of the flexible resilient member according to different embodiments.
Figure 2B:
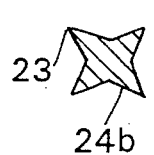
Figure 2C:
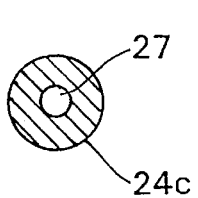
Figure 2D:
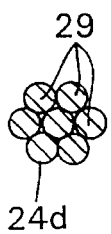
Figure 3:
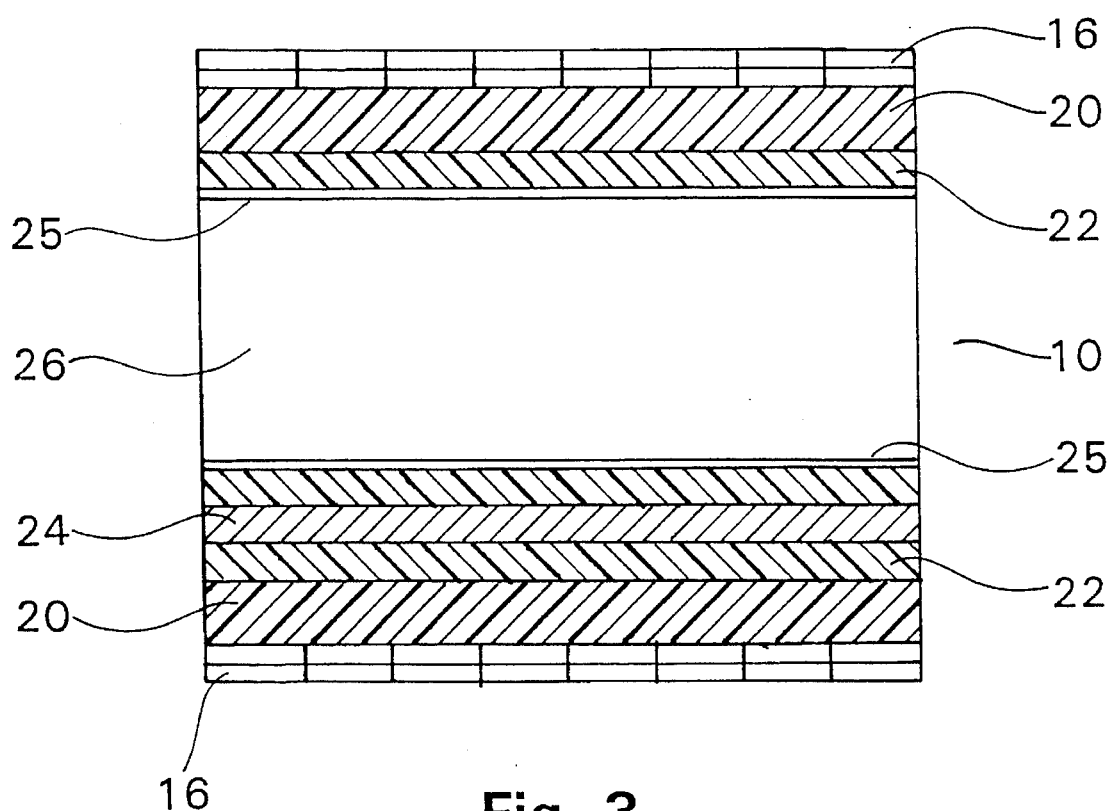
FIG. 3: is a cross-sectional view, taken through line 3—3 of FIGS. 1 and 2, illustrating yet another view of the preferred multiple layers of the fuel hose of the FIG. 1.

With reference to the Figures, and particularly to, FIGS. 1–3, there is shown a preferred fuel hose 100 of this invention. The fuel hose 100 is typically equipped with male and female fittings 14 and 12 for making suitable connections to components of a fuel system, for example, a gas tank and carburetor. As shown in FIGS. 2 and 3, an inner polymeric tube or liner 22 serves as a conduit for gaseous and liquid fuels, coolants, or other fluids. The inner surface of the liner 22 desirably includes an inner layer of semi-conductive carbon 25. The semi-conductive carbon layer 25 functions as an electrical ground and prevents degradation of potentially-hazardous electrical sparks within the fuel line.

The liner 22 further includes a resilient member or wire 24 disposed along the wall of the liner 22, and preferably within the wall of the liner so as to form an integral part thereof. According to especially preferred embodiments, the resilient member is substantially fixed and non-movable with respect to the wall portion of the conduit. By fixing or embedding the resilient member in the wall of the conduit, the present invention provides the advantages described herein. The resilient wire 24 is preferably selected to have a tensile strength significantly greater than the polymeric material of the liner 22 so as to assume most of the bending stresses occurring in the liner 22 during manufacturing, shipping, handling, and installation.

The composite fuel hoses of this invention should provide long-lasting service under extreme conditions which could include high temperature, caustic chemicals, and vibration. The materials used to form preferred liners include thermoset polymers, thermoplastic polymers, and hybrids, mixtures and copolymers thereof. If thermoplastic polymers are used, such polymers preferably have a melting point of at least about 300° F., and more preferably in excess of 500° F. It is also generally preferred that the present liners have excellent thermal and mechanical stability under a wide range of temperatures from about −100° F. to over 500° F. Such temperature thresholds, while not always necessary in automotive applications, are valuable in protecting fuel lines in aerospace applications in which large temperature cycles are regularly experienced. The hoses of this invention are preferably resistant to burning, smoking, or dripping during use, and desirably do not change their microstructure or composition during long exposures to high or extremely low temperatures. The liners of this invention are also preferably inert to most chemicals and compatible with the various types of fuel applied in automotive and aerospace applications. The liners are preferably conductive along their inner diameter, non-conductive along their outer diameter, and have extremely low permeability to vapors, such as fuel vapors. Finally, the hoses and liners of this invention should be readily coupled to available fittings. Preferred specifications for the hoses of this invention are illustrated below in Table I.

TABLE I

Approximate Hose Specifications

|  | Broad | Narrow |
| --- | --- | --- |
| Hose I.D. | up to .5 in. | .2–.4 in. |
| Liner Wall | up to .05 in. | .01–.04 in. |
| Hose O.D. | up to 1 in. | .2–.8 in. |
| Weight | less than 15 lb./100 ft. | 2–12 lb./100 ft. |
| Operating Pressure | at least 500 psi | 500–1,200 psi |
| Burst Pressure (minimum) | about 1,000 psi | 2,500–6,000 psi |
| Bend Radius (minimum) | about 1 in. | 1.5–4 in. |

As will be appreciated by those skilled in the art, the liner 22 of this invention will contain and be in contact with fluids in general and in certain embodiments lubricants, coolants, fuels, and/or vapors. As a result, the liner portions of the described hoses should not only possess flexibility and thermal and chemical stability, but also a high degree of resistance to liquid and vapor permeability. A large number of materials satisfy these requirements and may be used according to certain embodiments of this invention. Such materials include natural and synthetic rubber, polyamides such as nylon, polyesters, polyimides, polyetheretherketone (PEEK), polyetherimide (PEI), polyurethane, polyethylene, fluorocarbon, and silicone. It is generally preferred, however, that the liner 22 of the present hose 100 comprise a fluorocarbon polymer. As is well known, fluorocarbon polymers are a class of paraffinic polymers which have some or all of the hydrogen replaced by fluorine. The liners of the present invention can be formed from materials comprising fluorocarbon resin selected from the group comprising polytetrafluoroethylene (PTFE), fluorinated ethylene propylene copolymer (FEP), perfluoroalkoxy (PFA) resin, polychlortrifluoroethylene (PCTFE), ethylene-trichlortrifluoroethylene copolymer (ECTFE), ethylene-tetrafluoroethylene copolymer (ETFE), polyvinylidene fluoride (PVDF), polyvinyl fluoride (PVF), and mixtures of one or more of these resins. The properties for most of the preferred fluoropolymers are described in the following Table II.

TABLE II

Properties of Select Liner Materials

|  | PTFE | PFA | FEP | PVDF |
| --- | --- | --- | --- | --- |
| Deflection Temperature @ 66 psi (ASTM D648) | 250° F. | 164° F. | 158° F. | 298° F. |
| Deflection Temperature @ 264 psi | 132° F. | 118° F. | 124° F. | 235° F. |
| Melting Point | 620° F. | 590° F. | 554° F. | 352° F. |
| Abrasion Resistance Taber Abrasion Tester Abrasion Ring CS-10 Load 1 Kg (mg/1,000 cycles) | 500–1,000 | — | — | 5–10 |
| Tensile Strength @ 73° F. @ break | 2.5–6 ksi | 4–4.3 ksi | 2.7–3.1 ksi | 8 ksi |
| Permeability to Water Vapor ($cm^3/m^2$-day-bar) | 5 | 6 | .1 | 2 |

|  | ECTFE | PCTFE | ETFE |
| --- | --- | --- | --- |
| Deflection Temperature @ 66 psi (ASTM D648) | 240° F. | 258° F. | 220° F. |
| Deflection Temperature @ 264 psi | 170° F. | 167° F. | 165° F. |
| Melting Point | 464° F. | 424° F. | 518° F. |
| Abrasion Resistance Taber Abrasion Tester Abrasion Ring CS-10 Load 1 Kg (mg/1,000 cycles) | — | 13 | — |
| Tensile Strength @ 73° F. @ break | 7 ksi | 4.5–6 ksi | 6.5 ksi |
| Permeability to Water Vapor ($cm^3/m^2$-day-bar) | — | — | — |

While it is contemplated that all of the above fluorocarbon polymers, including homopolymers, copolymers, block and graft copolymers of any of the above resins, may be used, PTFE resin is preferred. According to an especially preferred embodiment of this invention, the liner 22 is a composite tube comprising an outer portion formed of PTFE resin and an inner portion 25 formed of a mixture of PTFE and semi-conductive carbon.

Importantly and critically, the hoses of this invention also include a resilient member, and preferably a resilient wire, 24 located along the liner 22. More preferably, the resilient wire 24 is located within a wall of the liner 22 and laterally disposed from the longitudinal passage 26. The resilient wire of this invention desirably includes an ultimate tensile strength (also referred to as "tensile strength"), which is substantially greater than the ultimate tensile strength of the polymeric material of the liner. As used herein, "tensile strength" provides a measure of resistance to tensile forces experienced during twisting and bending. It is preferred that the tensile strength of the wire 24 is at least about 20% greater, and preferably 50% greater, than the tensile strength of the liner material. The resilient wire 24 is most preferably located or placed within the wall of the liner 22 during, and preferably substantially simultaneously with, the manufacturing of the liner, for example, by co-extrusion or injection molding.

While it is contemplated that the spatial relationship between the resilient member and the liner 22 may vary in accordance with the present invention, applicants have found that in certain embodiments this relationship can be important to achieving the anti-kinking effects described herein without detracting from the flexibility of the tubular product. More specifically, it is generally preferred that, in the unstressed condition, the axis of the resilient member is substantially parallel to the axis of the liner, as shown for example in FIG. 3. In such a configuration, the tendency of the resilient member to return to its initial shape and to resist deformation provides the anti-kink benefits of the present invention without detracting from the overall flexibility of the liner.

It is also contemplated that the number of resilient members utilized in accordance with the present invention may also vary. However, it is presently contemplated that the use of one resilient member substantially fixedly embedded in the wall portion of the liner will provide a successful balance of the desired properties.

It is contemplated that the resilient wire 24 can have a cross-section of any configuration, including the forms further described in FIG. 2, such as a square shape 24a, a star shape 24b having pointed projections 23, a round shape 24c having hollow passage 27 and, a braided shape 24d including multiple strands 29 formed into a yarn. Each of these configurations may have design benefits which provide useful properties for certain applications in accordance with this invention.

The square and star configurations 24a and 24b, for example, are less susceptible to rotation within the wall of the preferred fluorocarbon liners of this invention. Since it is known that fluorocarbon polymers, such as PTFE, have an extremely low coefficient of friction, there may be a tendency for round wires, such as wire 24, to rotate during twisting and bending. Square and star configurations 24a and 24b minimize this tendency to rotate since there is an additional mechanical lock between the corners of the square and the pointed projections 23 of the star which substantially eliminate the tendency to rotate. On the other hand, it is desirable in many applications to minimize the chance of causing damage to the wall of the hose by the presence of sharp edges, projections, or points. In such situations, a wire 24 having a generally circular cross-section, as shown in 24, 24c, and 24d, is preferred.

Additional passages can be employed in connection with any of the cross-sectional resilient wires of this invention. With reference to the round shape 24c, for example, a hollow passage 27 having a longitudinal circular cross-section can be provided which extends throughout the length of its structure. This passage 27 can be used for oxygen sensing, or other diagnostic or fluid transfer applications.

Referring to the braided structure 24d, additional benefits can be achieved with multiple strands 29. Braids are not only useful in forming a mechanical bond with the preferred PTFE liner of this invention, but offer yet another opportunity for varying the mechanical behavior of the hose or liner since braided structures are known to be tougher and stronger.

The preferred resilient wires 24a–d preferably include a resilient fiber-filled polymer or metallic composition. Suitable materials for the resilient wires of this invention include those having a tensile strength of at least about 10 ksi and an impact strength of at least about 2 ft. lb./in. of notch. Such materials include KEVLAR®, i.e., poly-(p-phenylene terephthalamide) or poly-(p-benzamide), carbon or graphite fiber/epoxy matrix composites, glass fibers/epoxy matrix composites, stainless steel, and glass fiber/nylon matrix composites. Mechanical properties for selected ones of these materials are described in Table III below.

TABLE III

Properties of Select Resilient Wire Materials

| | Tensile Strength (ASTM D638) | Impact Strength (izod ft.-lb./in. of notch) |
|---|---|---|
| Glass Fiber/Epoxy Matrix Composite | 10–20 ksi | 2–30 |
| 304 Stainless Steel | 85–100 ksi | 110–115 |
| Glass Fiber/Nylon 6 ® Composite | 20–26 ksi | 2–4 |

Surrounding the liner 22 of this invention, preferably is a polymeric reinforcing layer 20. The reinforcing layer 20 covers, and preferably substantially surrounds, the liner 22. The liner 22 and polymeric reinforcing layer 20 can be meshed together with mating and interlocking ridges and valleys, or adhered to one another with heat or adhesive. Suitable materials for the polymeric reinforcing layer 20 include natural and synthetic rubbers, and thermoplastic polymers, for example, polyamide resin.

Finally, the outermost portion of the hose 100 comprises a tough, abrasion-resistant layer 16. The abrasion-resistant layer 16 can include a tough polymer layer, and most commonly includes a braided fiberglass composite structure. Such braided fiberglass structures are extremely resilient and chemically inert and provide a tough, abrasion-resistant coating to protect the softer reinforcing layer 20 and liner 22.

The preferred method for making the liners and hoses of this invention will now be described. For the purpose of illustration, the methods that will be disclosed relate to the production of hoses which include a liner of PTFE and a reinforcing layer of polyamide. It will be appreciated, however, that these methods are not limited to these materials, and that other materials and methods may be used to form the hoses and liners of the present invention.

The fuel hose 100 of this invention is preferably manufactured by providing a liner having an internal passage 26 and integral resilient wire 24 therein. The liner is preferably manufactured by forming a paste extruded PTFE tubular product using any one of a variety of applicable fabrication methods, including various extruding techniques known in the art. For example, powdered PTFE may be compressed into a cylindrical preform, and the center of preform may contain a semi-conductive carbon powder. The PTFE preform is then extruded in a typical and known fashion under conditions of elevated temperature and pressure. The extrusion would also include means for feeding in the resilient wire 24 simultaneously with the PTFE preform, so that both the wire and liner can be extruded co-extensively. This operation is normally referred to as co-extrusion. The internal passage 26, which can include a round cross-section, is desirably formed with a mandril in the extrusion dye. Further processing may be accomplished, for example by sintering to create desirable mechanical and compositional properties.

Figure 4:
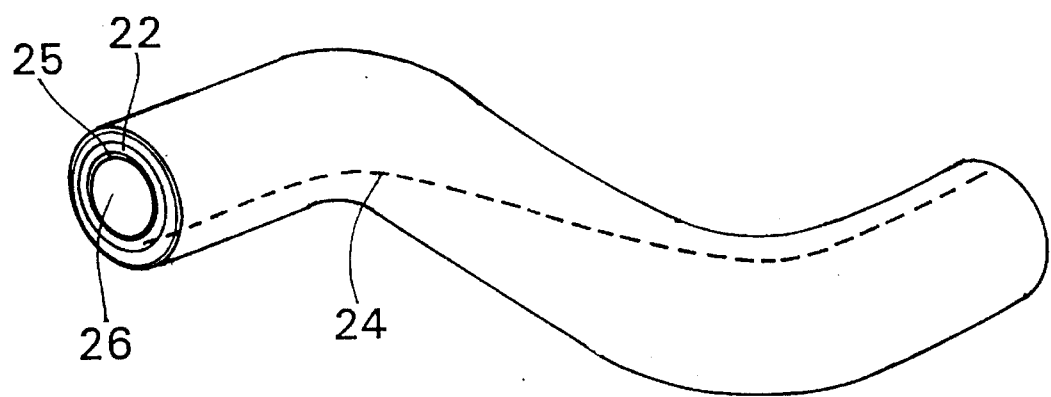
FIG. 4: is a perspective view of a preferred liner of this invention, illustrating how the resilient member rotates with the bending axis of the liner upon flexing the liner.

Finally, with reference to FIG. 4, there is shown a preferred liner 22 of this invention in a flexed condition. The liner includes an integral resilient wire 24, which is shown to conform to the inner arc of the bent portions of the flexed liner 22. It is understood that because of the relative differences in the tensile strengths of the wire 24 and liner 22, the resilient wire 24 will assume a position which is closest to the concave or compressive bending stresses occurring during the flexing of the liner 22. It has been observed that the liner 22 will actually twist so as to locate the resilient wire 24 to accept most of the bending load during flexing or other mechanical stress-inducing movement.

Furthermore, it has been discovered that, because the resilient member sufficiently carries the bending load developed during flexing of the liner, the kink-resistant fuel hose of this invention possesses significantly low values for minimum bend radius. As the term is used herein, bend radius refers to the inside radius of the arcuate portion of the bend in a sample hose. The bend in the sample hose is produced by bending the hose around a smooth cylinder of constant and known radius. The term minimum bend radius refers to the smallest bend radius such a sample hose is able withstand without failure or kinking. According to preferred embodiments, the fuel hose of this invention exhibits a minimum bend radius of less than about ten times the outside diameter of the fuel hose and preferably less than about five times the outside diameter and, even more preferably, less then about two times the outside diameter, with the preferred minimum bend radius being approximately equal to the outside diameter of the fuel hose. As the term is used herein, the minimum bend radius ratio refers to the ratio of the minimum bend radius of a tube having a resilient member or wire incorporated therein to the minimum bend radius of an otherwise substantially identical tube having no such resilient member or wire. The fuel hose liner of this invention provides for a minimum bend radius ratio of less than about 0.75, preferably less than about 0.50, and even more preferably less than about 0.25.

From the foregoing, it can be realized that this invention provides improved fuel hoses and liners and methods for their manufacture. The liners of this invention are electrically-conductive and resistant to chemical and thermal attack. The integral resilient wires help to absorb bending stresses and minimize the instances of plastic deformation and kinking in the preferred fluorocarbon liner materials. It has been demonstrated that a single resilient wire disposed within the wall of a fluorocarbon liner is more beneficial, and serves to reduce kinking greater, than two resilient wires disposed 180° apart along the wall of a sample liner.

The resulting fuel hoses produced by this invention will retain their vapor impermeability longer, and are expected to achieve longer service life in both aerospace and automotive applications. Although various embodiments have been illustrated, this was for the purpose of describing, but not limiting, the invention. Various modifications, for example, the use of the reinforced hoses for transmission, coolant and brake liners, which will become apparent to one skilled in the art, are within the scope of this invention described in the attached claims.

What is claimed is:

1. A flexible, kink-resistant hose, suitable for use with lubricant, fuel, and coolant systems, comprising a flexible polymeric tube showing a longitudinal axis, comprising a wall portion and a kink-resistant, flexible resilient member fixedly disposed parallel to the longitudinal axis and within said wall portion of said tube, and further Comprising an inner arc and outer arc when said tube is flexed, said resilient member having a tensile strength sufficiently greater than the tensile strength of the polymeric material of said tube, to ensure that said resilient member substantially conforms to the inner arc of said tube during flexing, wherein the bending load developed during flexing is substantially carried by said resilient member.

2. The hose of claim 1 wherein said wall portion has a thickness of less than about 0.05 inch.

3. The hose of claim 2 wherein said polymeric tube comprises fluorocarbon resin.

4. The hose of claim 1 wherein said polymeric tube has a melting temperature greater than about 300° F.

5. The hose of claim 1 wherein said wall portion defines at least a first passage having a circular cross-section and a diameter of less than about 0.5 inch.

6. The hose of claim 1 further comprising a polymeric reinforcing layer and an abrasion-resistant outer layer.

7. The hose of claim 6 wherein said polymeric tube consists essentially of a PTFE liner comprising a tensile strength of about 2.5–8 ksi and a permeability to water vapor of less than about 6 $cm^3/m^2$-day-bar.

8. The hose of claim 1 having a minimum bend radius of about 1 inch, a bursting pressure of at least about 1,000 psi, and an operating pressure of at least about 500 psi.

9. The hose of claim 1 wherein said resilient member comprises a tensile strength of at least about 10 ksi.

10. The hose of claim 9 wherein said resilient member comprises a metal.

11. The hose of claim 1 wherein said fluorocarbon polymer is selected from the group consisting of: PTFE, PFA, PVF, FEP, PVDF, ECTFE, PCTFE, ETFE, and combinations of two or more of these.

12. The hose of claim 1 wherein said resilient member comprises no more than a single wire.

13. The hose of claim 1 wherein said resilient member comprises a tensile strength at least about 20% greater than the tensile strength of said polymeric material.

14. The hose of claim 1 wherein said tube exhibits a minimum bend radius of less than about ten times an outside diameter of said tube.

15. The hose of claim 1 wherein said tube exhibits a minimum bend radius ratio of less than about 0.75.

16. A fuel system comprising:
a flexible, kink-resistant polymeric tube including a flexible fluorocarbon polymer liner having first and second ends and a first passage disposed between said first and second ends, said liner further comprising a longitudinal axis and a kink-resistant, flexible resilient wire located parallel to the longitudinal axis and within a wall of said tube, said tube comprising an inner arc and outer arc when said tube is flexed, and said resilient wire having a tensile strength sufficiently greater than said polymeric tube, to ensure that said resilient member substantially conforms to the inner arc of said tube during flexing, wherein the bending load developed during flexing is substantially carried by said resilient member; and
a tough, abrasion-resistant outer layer disposed substantially around said polymeric liner.

17. The fuel system of claim 16 wherein said liner comprises PTFE and said resilient wire comprises stainless steel.

18. The fuel system of claim 16 wherein said liner comprises no more than one resilient wire.

19. A flexible, kink-resistant hose, suitable for use with lubricant, fuel and coolant systems, comprising a flexible polymeric tube having a longitudinal axis comprising a wall portion and no more than one kink-resistant, flexible resilient member parallel to the longitudinal axis fixedly disposed in said wall portion, said resilient member having a tensile strength significantly greater than the tensile strength of the polymeric material of said tube.

20. The fuel hose of claim 19 wherein said resilient member comprises a metal wire, and said hose further comprises a tough, abrasion-resistant outer layer.

* * * * *